Jan. 3, 1933.  G. W. GIEFERS  1,892,665
AUTOMOBILE JACK
Filed Dec. 29, 1930    2 Sheets-Sheet 1
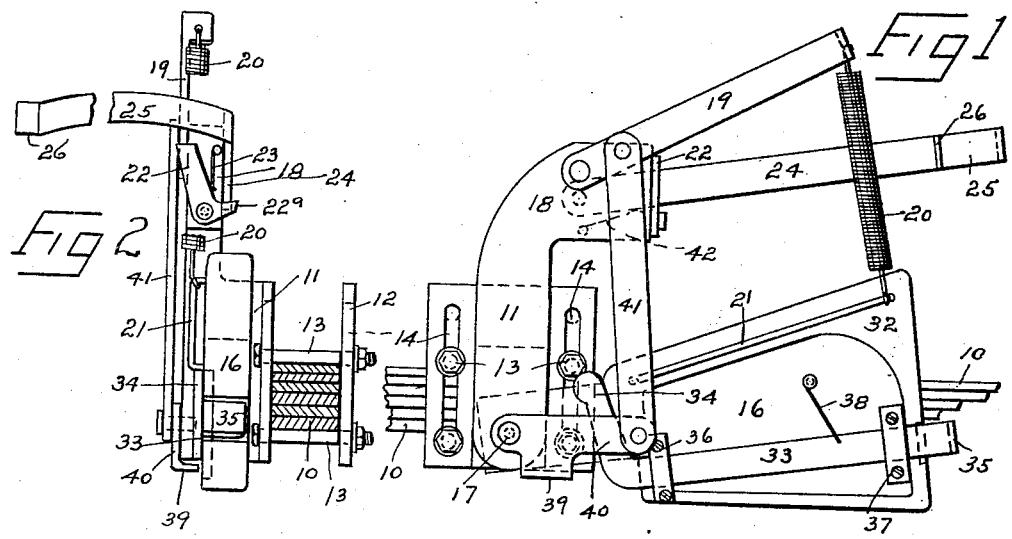
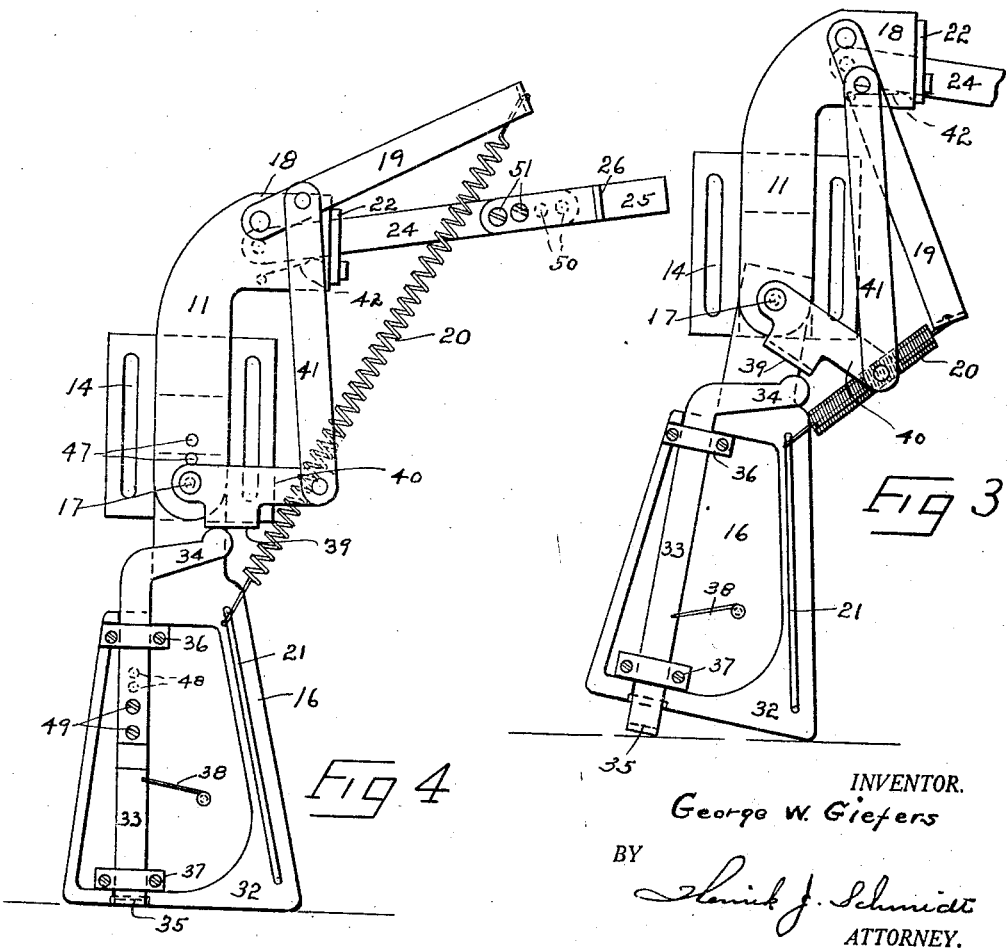
INVENTOR.
George W. Giefers
BY
Henrik J. Schmidt
ATTORNEY.

Jan. 3, 1933.  G. W. GIEFERS  1,892,665
AUTOMOBILE JACK
Filed Dec. 29, 1930   2 Sheets-Sheet 2
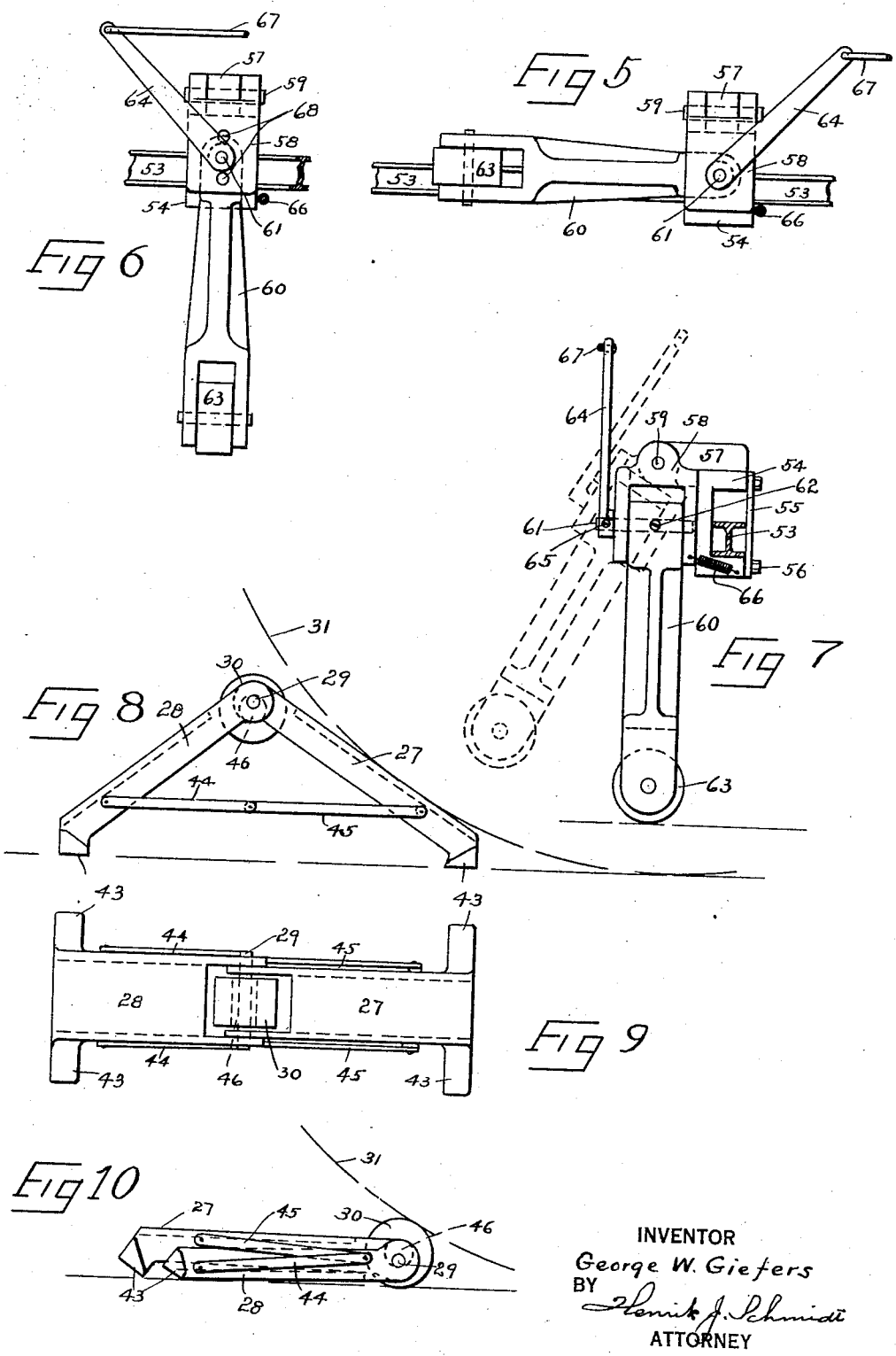
INVENTOR
George W. Giefers
BY
Henrik J. Schmidt
ATTORNEY Patented Jan. 3, 1933

1,892,665

UNITED STATES PATENT OFFICE

GEORGE W. GIEFERS, OF BROOKLYN, NEW YORK

AUTOMOBILE JACK

Application filed December 29, 1930. Serial No. 505,225.

The invention relates to lifting jacks and has for its main object to provide a set of jacking devices with which any of the wheels of an automobile or other vehicle may be lifted sufficiently from the ground to perform such work thereon as may be required, to have the jacks permanently attached to the vehicle for instant use, and to have the jacks operated by the power of the vehicle so that no manual labor is required. Another object is to provide a set of jacks of strong and rugged construction, easily adjusted for and attached to any make of automobile, and which can be manufactured at a comparatively low cost.

These and other objects and advantages will be readily understood from the following description and from the accompanying drawings of a preferred embodiment in which, however, certain modifications may be made without departing from the scope of the invention. In the drawings Fig. 1 is a side view of one of the rear wheel jacks shown in its inactive position.
Fig. 2 a front view of Fig. 1, Fig. 3 a side view of the same jack shown ready to go into its active position, Fig. 4 a side view showing the same jack in its active position.
Fig. 5 a front view of one of the front wheel jacks shown in its inactive position, Fig. 6 a front view of the same jack shown in its active position, Fig. 7 a side view of Fig. 6, Fig. 8 a side view of a foldable riser used in combination with all the jacks, Fig. 9 a top view of Fig. 8, and Fig. 10 a side view of the riser shown in its folded position.
Referring now to Figs. 1 to 4, the rear wheel jacks will first be described. These jacks, of which a left one and a right one is provided, are permanently clamped to the rear springs of an automobile close to, and preferably, in front of the rear axle. Fragment of such a spring is indicated by the numeral 10. Each of the rear jacks consists of a body member 11 which is clamped to the spring 10 by a clamping plate 12 and a plurality of bolts 13. These bolts are inserted through slots 14 so as to make the device adjustable to various sizes of springs as well as to various sizes of wheels.

The body member is bifurcated at its lower end and in this end a pedestal or support 16 is swingably mounted on a pin 17. The upper end 18 of the body member extends sidewardly and on this end a spring lever 19 is mounted. A tension spring 20 is attached between the outer end of the spring lever and an outwardly extending rod 21 the bent ends of which are secured to the pedestal. A latch 22, which is also mounted on the upper end 18 of the body member and held in engagement by a spring 23, normally holds the spring lever in its upper position, while the spring 20 holds the pedestal in the inactive position shown in Fig. 1.

The whole device is contained in the space between the outer side of the chassis and the inner side of the respective wheel on which employed. An operating lever 24 is also mounted on the upper end of the body member. Its outer end 25 is curved so that it may occupy the space between the outer circumference of the wheel and the inner side of the mud guard; the finger grip 26 extending outside the outer edge of the mud guard. It is by means of this finger grip that the pedestal is moved from its inactive to its active position.

When for any reason it is desired to lift one of the rear wheels, the riser shown in Figs. 8, 9 and 10 is employed. The riser, which consists of two channel-shaped members 27 and 28 hinged on a pin 29 on which a roller 30 is mounted, is wedged under the wheel which, when the car is driven forwards, mounts the riser. The broken line 31 represents the circumference of a wheel. The riser will be further described later.

Now when the operating lever is depressed it engages on the tail 22ª of the latch 22 and thus releases the spring lever. The weight of the pedestal causes this and the spring lever to drop and, as the pedestal is weighted in the corner 32, it assumes the position shown in Fig. 3. A further movement of the car causes the wheel to descend from the riser and the pedestal now assumes the position shown in Fig. 4.

A bar 33, which is provided with a sidewardly extending arm 34 at its upper end and a pressure foot 35 which is bent in under the base of the pedestal, is slidingly mounted in the pedestal. It is held in place by straps 36 and 37 and a flat spring 38 holds it in the position shown in Figs. 1 and 3. The end of the arm 34 engages with a surface 39 bent sidewardly on the lower edge of a lever 40 which is pivoted on the pin 17. The end of this lever connects with the spring lever by a link 41.

It is evident that as soon as the pedestal assumes the position shown in Fig. 4, the bar 35, through the arm 34, surface 39, lever 40 and link 41, restores the spring lever 19 to its latched position shown in Fig. 1. The spring 20 is now under full tension and its lower eye is at the upper end of the rod 21. The operating lever is restored by a spring 42 to its operative position.

To lower the wheel and bring the pedestal back to its inactive position, the riser, which has been partly described previously, is folded and its roller inserted under the wheel, as shown in Fig. 10. As the wheel is turned the folded riser is drawn under it and, as the car and consequently the pedestal is lifted, the tension of the spring 20 restores the pedestal to its inactive position. In doing so the lower eye of the spring travels along the rod 21.

The riser is provided with feet 43 to prevent it from tipping and with side links 44 and 45 to limit the amount to which it may open. The roller is preferably made with a large, concentric hole 46 so that it will "float" on the pin 29. The member 27 is narrower than the member 28 so that it can be folded into this.

Fig. 4 shows means by which the rear wheel jacks may be adjusted for various sizes of wheels. These means consist of additional holes 47 drilled in the lower end of the body member in which the pin 17 may be inserted to alter the height of the pedestal, additional holes 48 in which the screws 49 may be inserted to alter the length of the bar 35, and additional holes 50 in which screws 51 may be inserted to alter the length of the operating lever 24.

The front wheel jack, which is also made right and left and which is clamped to the front axle 53, is shown in Figs. 5, 6 and 7. Each consists of a clamping member 54 which by means of a plate 55 and a plurality of bolts 56 clamps the device to the front axle 53. An upwardly and forwardly extending projection 57 is cast integral with the clamping member. To the forward end of this projection a hinged member 58 is secured on a pin 59. In the lower, bifurcated end of the hinged member a leg or pedestal 60 is mounted on a short shaft 61. The pedestal is secured to the shaft by a set screw 62 but the shaft is free to turn in the bearings formed in the hinged member. A roller 63 is mounted in the lower end of the pedestal and an operating lever 64 is secured on the shaft 61 by a set screw 65. A tension spring 66 holds the hinged member against the clamping member.

The front wheel jack is shown in its inoperative or inactive position in Fig. 5, in which position it is held by a rod 67 fastened to some convenient part of the car. When it is desired to lift one of the front wheels, the wheel is run up on the riser, as previously explained, and the rod 67 is released from its fastenings. This causes the pedestal to assume the position shown in Fig. 6. When the wheel descends from the riser the car will rest on the pedestal. When it is again desired to lower the wheel to the ground, the car is backed up. This causes the pedestal to swing to the dotted line position shown in Fig. 7. From this position it is restored to its inactive position by a pull on the rod 67. In addition to the adjustment which may be made by shifting the clamping member on the axle, a plurality of holes 68 are drilled in the hinged member for the shaft 61; by this means the height of the pedestal may be varied.

The foregoing will show that I have succeeded in providing a set of jacks which may be employed on various makes of cars and which can be operated with great ease and practically without any manual labor.

Having described my invention and its operation, what I claim as new and wish to protect by Letters Patent is:

1. In a device of the class described, a pedestal swingably mounted on a bracket secured on the chassis of an automobile, a series of levers mounted on said bracket, means attached between one end of one of said levers and the pedestal for holding the pedestal in its upper or inactive position, a latch mounted on the bracket for locking said lever in its upper position, and a lever for releasing said latch to move the pedestal into operative position.

2. In a device of the class described, a pedestal swingably mounted on a bracket secured on the chassis of an automobile, a series of levers mounted on said bracket, a spring attached between one end of one of said levers and the pedestal, the end of the spring adjacent to the pedestal being slidingly engaged on a rod secured on the pedestal, a latch mounted on the bracket for locking said lever in its upper position, a lever for releasing said latch, and a bar extending below the base of the pedestal for restoring said first-mentioned lever to its upper position after it has been released by the latch and for increasing the tension on the spring between said lever and the pedestal so that the pedestal will be restored to its inactive position when lifted from the ground.

GEORGE W. GIEFERS.